US012404147B2

(12) United States Patent
Backman et al.

(10) Patent No.: US 12,404,147 B2
(45) Date of Patent: Sep. 2, 2025

(54) SYSTEM AND METHOD OF DETECTING A DRAGGING BRAKE IN AN ELEVATOR APPLICATION

(71) Applicant: Magnetek, Inc., Menomonee Falls, WI (US)

(72) Inventors: John A. Backman, Cedarburg, WI (US); Bryan Radke, West Allis, WI (US); Marcus Adams, Plymouth, WI (US)

(73) Assignee: Magnetek, Inc., Menomonee Falls, WI (US)

( * ) Notice: Subject to any disclaimer, the term of this patent is extended or adjusted under 35 U.S.C. 154(b) by 1144 days.

(21) Appl. No.: 17/321,991

(22) Filed: May 17, 2021

(65) Prior Publication Data

US 2022/0363512 A1 Nov. 17, 2022

(51) Int. Cl.
*B66B 5/00* (2006.01)

(52) U.S. Cl.
CPC .......... *B66B 5/0025* (2013.01); *B66B 5/0031* (2013.01)

(58) Field of Classification Search
CPC ............................ B66B 5/0025; B66B 5/0031
USPC .......................................................... 187/391
See application file for complete search history.

(56) References Cited

U.S. PATENT DOCUMENTS

| | | | |
|---|---|---|---|
| 6,095,289 | A | 8/2000 | Ray et al. |
| 7,350,883 | B2 | 4/2008 | Hubbard et al. |
| 8,584,812 | B2 | 11/2013 | Dorsch et al. |
| 9,791,009 | B2 | 10/2017 | Hubbard et al. |
| 9,919,896 | B2 | 3/2018 | Xie et al. |
| 10,000,366 | B2 | 6/2018 | Hubbard et al. |
| 10,131,520 | B2 | 11/2018 | Kattainen et al. |
| 10,745,244 | B2 | 8/2020 | Sudi et al. |
| 2017/0349403 | A1 | 12/2017 | Kattainen et al. |
| 2019/0177114 | A1 | 6/2019 | Fargo |
| 2019/0330014 | A1 | 10/2019 | Kattainen et al. |

(Continued)

FOREIGN PATENT DOCUMENTS

| | | | |
|---|---|---|---|
| JP | 2014227233 | A | 12/2014 |
| WO | 2005066057 | A2 | 7/2005 |

OTHER PUBLICATIONS

Haenninen (WO 2005066057 A2) Method for Testing the Condition of the Brakes of an Elevator (Year: 2005).*

(Continued)

*Primary Examiner* — Jorge L Carrasquillo
(74) *Attorney, Agent, or Firm* — Boyle Fredrickson, S.C.

(57) ABSTRACT

A system and method for detecting a brake dragging during normal operation of a motor monitors torque at zero speed and at constant speed. For an inertial system acted upon by gravity, a value of torque required to maintain zero speed is approximately the same as a value of torque required to maintain operation at a constant speed. In an exemplary, elevator system, a motor drive determines the torque required to maintain zero speed operation of an elevator cab after a holding brake opens and before it begins controlling the motor to rotate. The motor drive again determines the torque required to maintain a constant speed and compares this value to the value of torque required to maintain zero speed. If the difference between the two values of torque is greater than a predefined threshold, then the motor drive determines that the brake is dragging and sets an error message.

20 Claims, 6 Drawing Sheets

(56) References Cited

U.S. PATENT DOCUMENTS

| | | | | |
|---|---|---|---|---|
| 2020/0180906 | A1 | 6/2020 | Li et al. | |
| 2021/0114841 | A1 | 4/2021 | Calcagno et al. | |
| 2022/0024715 | A1* | 1/2022 | Roberts | B66B 5/0037 |
| 2022/0363512 | A1* | 11/2022 | Backman | B66B 5/0031 |

OTHER PUBLICATIONS

Hubbard et al. (EP 2406163 B1) Brake Torque Control (Year: 2018).*
Calcagno et al. (CN 112678637 A), Method for Monitoring the Braking Drag of an Elevator (Year: 2021).*
European Search Report for Application No. 22805138.9, dated Feb. 24, 2025 (6 pages).
PCT International Search Report mailed Jul. 22, 2022; International Application No. PCT/US2022/024612—(4) pages.
International Preliminary Report on Patentability for Application No. PCT/US2022/024612 dated Nov. 21, 2023 (5 pages).

* cited by examiner

SYSTEM AND METHOD OF DETECTING A DRAGGING BRAKE IN AN ELEVATOR APPLICATION

BACKGROUND INFORMATION

The subject matter disclosed herein relates to a system and method for detecting a dragging brake in an elevator application and, more specifically, to a system and method for monitoring torque during operation of a motor controlling an elevator cab to determine proper operation of a holding brake in the elevator drive train.

Elevators are typically implemented as counterbalancing systems. Accordingly, cables, also referred to as ropes, are typically provided around a sheave (a grooved spindle or pulley), mounted to the top of an elevator cab in order to raise or lower the cab within an elevator shaft. A first end of the cables may be mounted to a first point at the top of the shaft and routed down and around a sheave mounted to the top of the cab. The cables may then be routed up over a sheave mounted to an electric motor with a drive shaft there between. The cables may then continue around one or more sheaves mounted to a counterweight, then back to a second point at the top of the shaft. Use of the counterweight provides counterbalancing with the cab which may permit the motor to lift a differential weight between the counterweight and the cab (as opposed to the entire weight of the cab). Various configurations of cables, sheaves, and cable routing may be utilized.

To ease strain on the motor and provide further safety in the system, a holding brake is typically used in conjunction with the motor. Operation of a holding brake is fundamentally different than a brake used to slow or stop a rotating motor, such as in a vehicular application. A motor drive controls operation of the motor to bring the motor to a stop, or nearly to a stop, prior to setting the brake. When the elevator cab is brought to a stop, the motor drive is commanded to maintain operation of the motor at zero speed as the brake is set. The motor drive may subsequently be disabled after the brake is engaged to hold the sheave, cables, cab and counterweight stationary. To resume motion, such as upon a call for the elevator to move to another floor, the motor drive is enabled and again commanded to hold the motor at zero speed. The brake is released and the motor drive may then be commanded to control the motor to move the cab as desired.

For safety, the holding brake is configured to normally engage the elevator drive train, applying a braking force when no power is supplied to the motor. It is contemplated that the holding brake may be connected at a shaft of the motor or on an external rotating member of the elevator drive train, such as the drive sheave. A spring applies a force against a brake member, such as brake pads, which, in turn, engage the rotating member of the elevator drive train. An actuator is energized to compress the spring. Power must be applied to the actuator to compress the spring and to release the holding brake, allowing rotation of the motor. In the event of a power failure or prior to energization of the system, the actuator is deenergized, causing the brake to set and stopping motion of the elevator cab.

As is known to those skilled in the art, a holding brake for an elevator commonly includes adjustments to optimize operation of the brake. The available adjustments may vary the force applied by the spring, the force applied by a solenoid to open the brake, a holding force applied by the solenoid after the brake is open, or a holding torque applied by the brake to the elevator drive train. During commissioning of an elevator, operation of the holding brake is adjusted to obtain desired operation. Over time or due to varying operating conditions, however, the brake may go out of adjustment, deviating from desired operation. This may cause the brake to not fully open (also referred to as a dragging brake) which, in turn, applies some friction force to the drive train during normal operation. The friction force may cause increased heating, excessive wear in brake surfaces, energy losses in the elevator system and, potentially, lead to the brake being unable to hold the elevator cab when the motor is not providing a holding torque.

Thus, it would be desirable to detect a brake dragging during normal operation of a motor driving the system in which the holding brake is installed.

BRIEF DESCRIPTION

According to one embodiment of the invention, a system for detecting a dragging brake in an elevator drive includes an elevator brake, a motor, and a motor drive. The elevator drive may further include an elevator sheave and/or a gearbox operatively connected to the motor. The elevator brake includes at least one braking surface configured to engage a rotating member of the elevator drive to prevent rotation of the elevator drive and a spring configured to apply a force to the at least one braking surface, causing the at least one braking surface to engage the rotating member of the elevator drive. The elevator brake also includes an actuator selectively activated to apply a counter force to the spring. When the counter force is applied to the spring, the at least one braking surface disengages the rotating member of the elevator drive, allowing rotation of the elevator drive. The motor is operably connected to cause rotation of the elevator drive, and the motor drive is configured to control operation of the motor. The motor drive further includes a memory configured to store instructions and a processor configured to execute the instructions stored on the memory. The processor is configured to determine a first value of torque when the actuator of the elevator brake initially disengages the at least one braking surface from the rotating member of the elevator drive and prior to causing rotation of the elevator drive and to determine a second value of torque when the motor is rotating at a constant speed. The processor compares the first value of torque to the second value of torque to detect when the at least one braking surface of the elevator brake does not fully disengage the rotating member of the elevator drive during rotation of the elevator drive.

According to another aspect of the invention, the motor drive is configured to generate a torque reference value corresponding to a desired level of torque supplied by the motor, where the first and second values of torque may be torque reference values. Optionally, the motor drive further comprises at least one current sensor configured to generate a current feedback signal corresponding to current output from the motor drive to the motor, and the first and second values of torque may be determined as a function of the current feedback signal.

According to still another aspect of the invention, comparing the first value of torque to the second value of torque includes determining a difference between the first and second values of torque. Detecting when the at least one braking surface of the elevator brake does not fully disengage the rotating member of the elevator drive during rotation of the elevator drive may include comparing the difference to a predetermined threshold and detecting the dragging brake when the difference is greater than the predetermined threshold. Optionally, the motor drive may be further configured to initially determine an offset value between the first value of torque and the second value of torque. Detecting when the at least one braking surface of the elevator brake does not fully disengage the rotating member of the elevator drive during rotation of the elevator drive may include comparing the difference to the offset value and detecting the dragging brake when the difference is greater than the offset value.

According to another embodiment of the invention, a system for detecting a dragging brake for an electric motor includes a motor and a motor drive. The motor is configured to control motion of a drive train for a load having an additional force acting on the load to cause motion of the load when not controlled by the drive train, and the motor drive is operatively connected to the motor. The motor drive is configured to determine a first value of torque when a holding brake in the drive train is initially released and prior to causing motion of the drive train with the motor. The motor drive is also configured to determine a second value of torque when the motor is rotating at a constant speed and to compare the first value of torque to the second value of torque to detect when the holding brake does not fully disengage the drive train during operation of the motor.

According to yet another aspect of the invention, the motor drive further comprises an input configured to receive a position feedback signal, and the position feedback signal is generated by a position feedback device operatively connected to the motor. The position feedback signal corresponds to an angular position of the motor, and the motor drive is configured to control operation of the motor to maintain the load at an initial position determined from the position feedback signal when the holding brake is released and until the first value of torque is determined.

According to yet another embodiment of the invention, a method for detecting a dragging brake for an electric motor is disclosed. A first value of torque, generated in a motor operatively connected to a motor drive, is determined when a holding brake in a drive train between the motor and a load controlled by the motor is initially released. The motor drive is configured to determine the first value of torque, and the load has an additional force acting on the load to cause motion of the load when not controlled by the drive train. A second value of torque is determined when the motor is rotating at a constant speed, and the first value of torque is compared to the second value of torque to detect the dragging brake.

These and other advantages and features of the invention will become apparent to those skilled in the art from the detailed description and the accompanying drawings. It should be understood, however, that the detailed description and accompanying drawings, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

Various exemplary embodiments of the subject matter disclosed herein are illustrated in the accompanying drawings in which like reference numerals represent like parts throughout, and in which.

Figure 1:
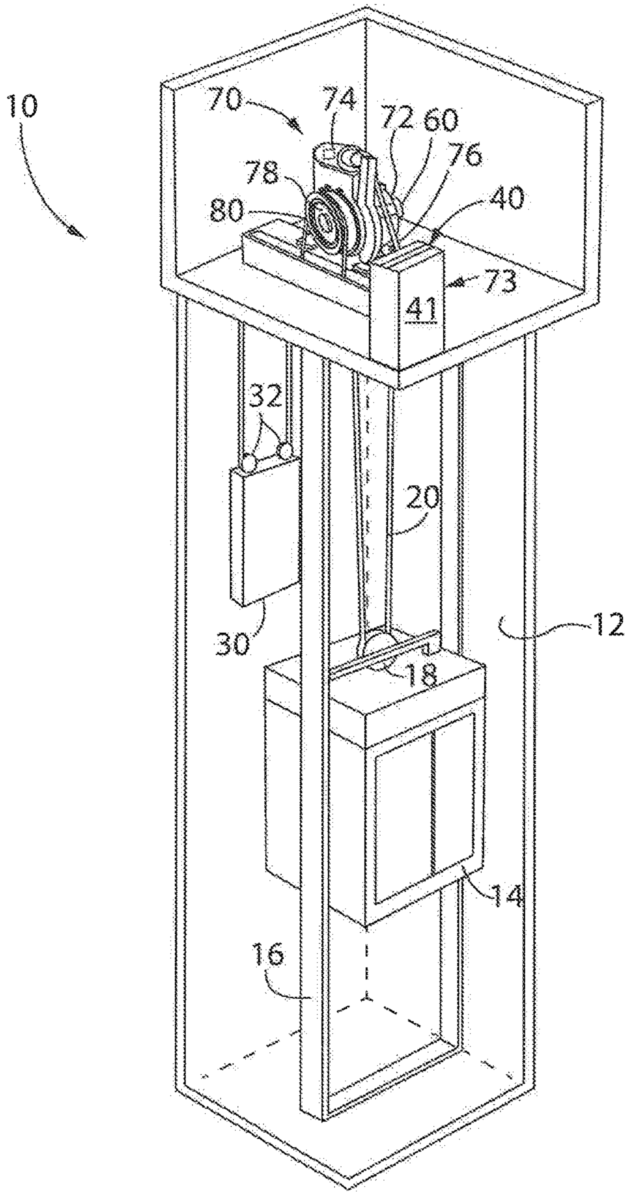
FIG. 1 is an exemplary elevator system including an elevator cab and a counterweight in which the system provides an electrical motor, a brake, an encoder and a controller in accordance with an embodiment of the invention.

In describing the various embodiments of the invention which are illustrated in the drawings, specific terminology will be resorted to for the sake of clarity. However, it is not intended that the invention be limited to the specific terms so selected and it is understood that each specific term includes all technical equivalents which operate in a similar manner to accomplish a similar purpose. For example, the word "connected," "attached," or terms similar thereto are often used. They are not limited to direct connection but include connection through other elements where such connection is recognized as being equivalent by those skilled in the art.

DETAILED DESCRIPTION

The various features and advantageous details of the subject matter disclosed herein are explained more fully with reference to the non-limiting embodiments described in detail in the following description.

The subject matter disclosed herein describes a system and method to detect a brake dragging during normal operation of a motor driving the system in which the holding brake is installed. A motor drive is configured to control operation of a motor for a drive train, which is, in turn, connected to a load having a force applied to the load in addition to forces applied by the drive train. The force may be, for example, gravitational or the result of another motor in the system. In particular, the present system and method is well adapted to detect a holding brake which is dragging in an elevator application. A typical elevator application includes a cab and a counter weight connected together via cables, also referred to as ropes. A holding brake engages a drive train to prevent undesired motion of the cab when the motor is not energized, and the motor is connected via the drive train to a sheave to drive the ropes and, in turn, drive the elevator cab to a desired floor.

A single cycle of operation for an elevator begins with an elevator cab stopped at a floor of the building in which it operates. A call from another floor or a signal from within the elevator cab to move to another floor initiates a run. A controller enables the motor drive and issues a command to the motor drive to begin operating at zero speed. When the motor drive is able to provide a holding torque to the motor, the controller generates a command to the holding brake to open. An actuator on the holding brake applies a force counter to the spring force releasing the brake pad, or other braking surface, from the elevator drive train. Once the brake is released and prior to beginning motion of the elevator cab, the motor drive is supplying a current to the motor which provides the required holding torque in the motor to maintain zero speed operation without relying on the holding brake. The motor drive is configured to determine the amount of torque required to maintain zero speed operation before it begins causing the motor to rotate. As the motor begins to move, the motor is accelerated from zero speed to a constant running speed. During acceleration, additional current beyond that required to hold the load at zero speed is required to accelerate the motor and, in turn, accelerate the elevator cab up to speed. Once the motor has reached the maximum desired operating speed, the motor continues running at that constant speed.

In an ideal, balanced elevator system, the amount of torque required to maintain constant speed operation during this constant speed operation would be nearly identical to the amount of torque required to hold the motor at zero speed without the holding brake set, and the motor would only be required to generate torque for acceleration or deceleration between constant speed and zero speed operation due to the inertia of the system. Although some inefficiencies in a non-ideal system, such as friction from the ropes or in a gearbox, may require some additional torque to maintain constant speed operation, the torque required to maintain operation at constant speed in a balanced system is still approximately the same as that required to maintain zero speed. The motor drive determines the torque required to maintain a constant speed and compares this value to the value of torque required to maintain zero speed. If the difference between the two values of torque is greater than a predefined threshold, this indicates there is an unexpected force, such as friction from a dragging brake, slowing the system that the motor must overcome. As a result the motor drive determines that the brake is dragging and sets an error message.

Turning initially to FIG. 1, an exemplary elevator system 10 is illustrated in accordance with an embodiment of the invention. A shaft 12 includes a cab 14 configured to move up and down the shaft 12. The cab 14 includes, for example, wheels configured to engage rails 16 extending vertically along each side of the shaft 12 to maintain horizontal alignment of the cab 14 within the shaft 12. Cables 20 extending around one or more cab sheaves 18 mounted to the top of the cab 14 may be used to raise or lower the cab 14 within the shaft 12. According to the illustrated embodiment, a first end of the cables 20 is fixedly mounted to a first point at the top of the shaft 12 and routed down and around the cab sheave 18 mounted to the top of the cab 14. The cables 20 are then routed up and over one or more drive sheaves 78 mounted to an electrical motor 70. The cables 20 continue around one or more counterweight sheaves 32 mounted to a counterweight 30 and back to a second point at the top of the shaft 12. It is contemplated that various other configurations of cables, sheaves, and cable routing may be utilized according to the application requirements without deviating from the scope of the invention.

According to the illustrated embodiment, the motor 70 may be mounted in a machine room located above the elevator shaft 12. The motor 70 may be connected via a gearbox to the drive sheave 78, where the motor, gearbox, and drive sheave form the elevator drive train. Optionally, the motor 70 and drive sheave 78 may be formed as a single unit, where the drive sheave is, at least in part, the rotor of the motor, forming a direct-drive system. In some applications, and, particularly with a direct drive system, the motor 70 may be mounted in the elevator shaft 12. A brake 60, is operatively connected to the elevator drive train to prevent rotation. The brake 60 may be connected to an output shaft of the motor 70 or to the sheave 78. An encoder 80 is operatively connected to the motor 70 to provide a feedback signal corresponding to an angular position of the motor 70. According to the illustrated embodiment, a control cabinet 41 is provided in the machine room. The control cabinet 41 may include a motor drive 40 to control operation of the motor and a separate controller 73 providing instructions to the motor drive 40. A junction box 74 may be mounted to the top of a housing 72 of the motor 70, and electrical conductors 76 may run between the control cabinet 41 and the junction box 74, the motor 70, the brake 60, and the encoder 80 to connect the motor drive 40 and the controller 73 with the motor, brake, and encoder. The electrical conductors 76 may conduct electrical power and control signals to or feedback signals from the motor 70, the brake 60, and the encoder 80 as will be further described.

Figure 2:
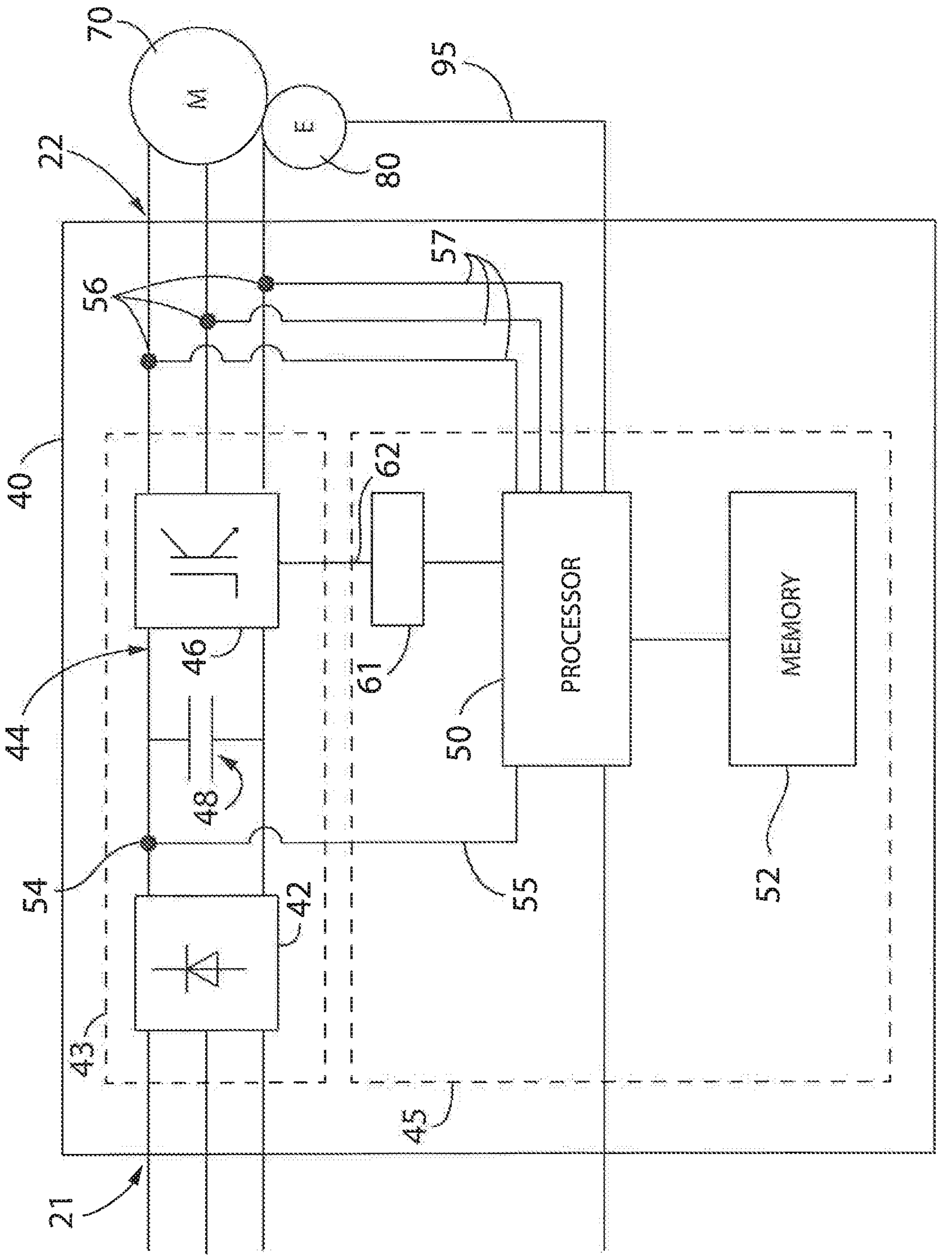
FIG. 2 is a block diagram representation of a motor drive operative to control the electrical motor of FIG. 1.

Referring also to FIG. 2, the motor drive 40 includes a power conversion section 43 and a control section 45. The power conversion section 43 converts the input power 21 to the desired voltage at the output 22. According to the illustrated embodiment, the power conversion section 43 includes a rectifier section 42 and an inverter section 46, converting a fixed AC input 21 to a variable amplitude and variable frequency AC output 22. Optionally, other configurations of the power conversion section 43 may be included according to the application requirements. The rectifier section 42 is electrically connected to the power input 21. The rectifier section 42 may be either passive, such as a diode bridge, or active, including controlled power electronic devices such as transistors. The rectifier section 42 converts the AC voltage input 21 to a DC voltage present on a DC bus 44. The DC bus 44 may include a bus capacitance 48 connected across the DC bus 44 to smooth the level of the DC voltage present on the DC bus 44. As is known in the art, the bus capacitance 48 may include a single or multiple capacitors arranged in serial, parallel, or a combination thereof according to the power ratings of the motor drive 40. An inverter section 46 converts the DC voltage on the DC bus 44 to the desired voltage at the output 22 for the motor 70 according to switching signals 62.

The control section 45 receives a command signal, feedback signals and generates the switching signals 62 responsive to the command and feedback signals to achieve desired operation of the motor 70. The control section 45 includes a processor 50 connected to a memory device 52. It is contemplated that the processor 50 may be a single processor or multiple processors operating in tandem. It is further contemplated that the processor 50 may be implemented in part or in whole on a field programmable gate array (FPGA), an application specific integrated circuit (ASIC), a logic circuit, or a combination thereof. The memory device 52 may be a single device or multiple electronic devices, including static memory, dynamic memory, transitory memory, non-transitory memory, or a combination thereof. The memory device 52 preferably stores parameters of the motor drive 40 and one or more programs, which include instructions executable on the processor 50. A parameter table may include an identifier and a value for each of the parameters. The parameters may, for example, configure operation of the motor drive 40 or store data for later use by the motor drive 40.

A motor control module may be stored in the memory 52 for execution by the processor 50 to control operation of the motor 70. The processor 50 receives feedback signals, 55 and 57, from sensors, 54 and 56 respectively. The sensors, 54 and 56, may include one or more sensors generating signals, 55 and 57, corresponding to the amplitude of voltage and/or current present at the DC bus 44 or at the output 22 of the motor drive 40 respectively. The processor 50 also receives a position feedback signal 95 from the position sensor 80, such as an encoder or resolver, mounted to the motor 70. The switching signals 62 may be determined by an application specific integrated circuit 61 receiving reference signals from a processor 50 or, optionally, directly by the processor 50 executing the stored instructions. The switching signals 62 are generated, for example, as a function of the feedback signals, 55, 57, and 95, received at the processor 50.

The controller 73 in the control cabinet 41 may similarly include a processor and a memory device. It is contemplated that the processor for the controller 73 may be a single processor or multiple processors operating in tandem. It is further contemplated that the processor for the controller 73 may be implemented in part or in whole on a field programmable gate array (FPGA), an application specific integrated circuit (ASIC), a logic circuit, or a combination thereof. The memory device for the controller 73 may be a single or multiple electronic devices, including static memory, dynamic memory, transitory memory, non-transitory memory, or a combination thereof. The memory device for the controller preferably stores parameters for operation of the elevator 10 and one or more programs, which include instructions executable on the processor for the controller 73.

It is contemplated that a portion of the method for controlling motion of the counterbalancing system as described herein may be implemented in whole or in part in the processor 50 of the motor drive 40, the controller 73, or a combination thereof. For ease of discussion, the method will be discussed as being implemented on the processor 50 of the motor drive 40.

Figure 3:
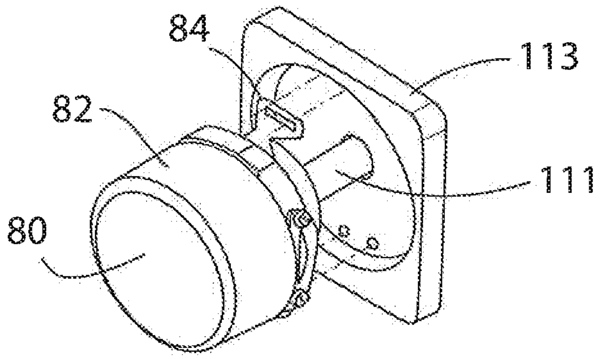
FIG. 3 is a partial isometric view of an exemplary encoder which may be used in the system of FIG. 1.

Referring next to FIG. 3, a partial isometric view of an exemplary encoder which may be used in the system of FIG. 1 is provided in accordance with an embodiment of the invention. An encoder 80 may be coupled to a rotor or to a drive shaft 111, which is, in turn coupled to the rotor. A mounting bracket 84 may be provided to secure a housing 82 of the encoder 80 to a mounting surface 113 provided in the system, such as a mounting surface 113 proximal to the drive sheave 78. The encoder 80 may be, for example, a high-resolution shaft mounted encoder, such as an EnDat® interface bidirectional rotary encoder available from Heidenhain GmbH of Germany. The encoder 80 includes a transducer in communication with the drive shaft 111 to convert the rotary motion of the drive shaft 111 into an electric signal 95. The electric signal 95 may be a series of pulses, a sinusoidal waveform, or a serial data word containing the angular position information. The encoder 80 also includes an electronic circuit configured to transmit the electric signal 95 from the transducer to the motor drive 40 via an encoder cable. As a result, the encoder 80 is operative to detect motion of the rotor or drive shaft 111 by detecting angular movement. The illustrated encoder 80 is shown by way of example and is not intended to be limiting. Optionally, a resolver or another position feedback device, providing a signal corresponding to an angular position of the rotor or drive shaft 111, may be utilized in place of the encoder 80. In other embodiments, additional and/or alternative encoders, resolvers, or positions sensors may be used, and in the same or alternative locations, within the scope of the invention.

Figure 4:
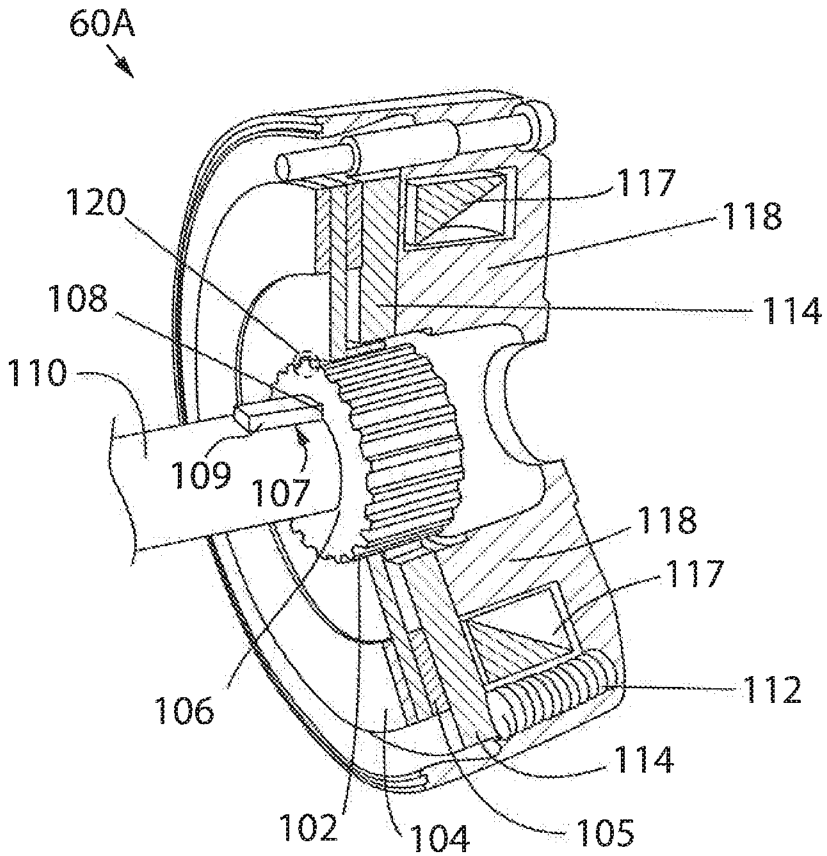
FIG. 4 is a partial cutaway view of an exemplary brake which may be used in the system of FIG. 1 which includes a toothed hub and a grooved rotor in which engagement of the toothed hub with the grooved rotor may provide a brake in the system.

Referring now to FIG. 4, a partial cutaway view of a first exemplary brake 60A which may be used in the system of FIG. 1 is provided in accordance with an embodiment of the invention. The illustrated brake 60A includes a toothed hub 102 and a grooved brake rotor 104. The toothed hub 102 may have a central aperture 106 for mounting to a drive shaft 110 extending from the motor rotor. A notch 108 in the hub 102 is configured to receive a motor key 109, where the motor key 109 is also fit in a keyway 107 on the motor shaft 110. The hub 102 is mounted to the motor shaft 110 and the motor key 109 engages both the notch 108 and the keyway 107 to prevent slippage of the hub 102 on the motor shaft 110. The grooved brake rotor 104 is then slid on to the toothed hub 102 as the brake 60 is mounted to the motor 70. The brake rotor 104 rotates with the toothed hub during operation of the motor 70.

The brake 60A is operative in one of two states. During a first, unenergized state, the brake is set and prevents rotation of the motor 70. In the first state, one or more springs 112 press an armature disk 114 against a friction plate 105 mounted to the grooved rotor 104, thereby holding the grooved rotor 104 stationary. As a result, the friction plate 105 holds the grooved rotor 104 and, in turn, the hub 102 stationary. Thus, when the brake is unenergized, the springs 112 cause the brake 60 to be set and hold the drive shaft 110 stationary.

During a second, energized state, the brake 60A is released and allows rotation of the motor 70. In the second state, power is provided to an electromagnetic coil 117 wound on a core 118 within the brake 60 in order to establish a magnetic field. The magnetic field is of sufficient strength to attract the armature disk 114 to the core 118 against the force resulting from compressing the spring 112. Drawing the armature disk 114 toward the core disengages the disk from the friction plate 105 on the grooved rotor 104. With the brake 60 in the released state, the grooved rotor 104 is able to rotate, which, in turn, allows the hub 102 and drive shaft 110 to rotate.

Figure 5:
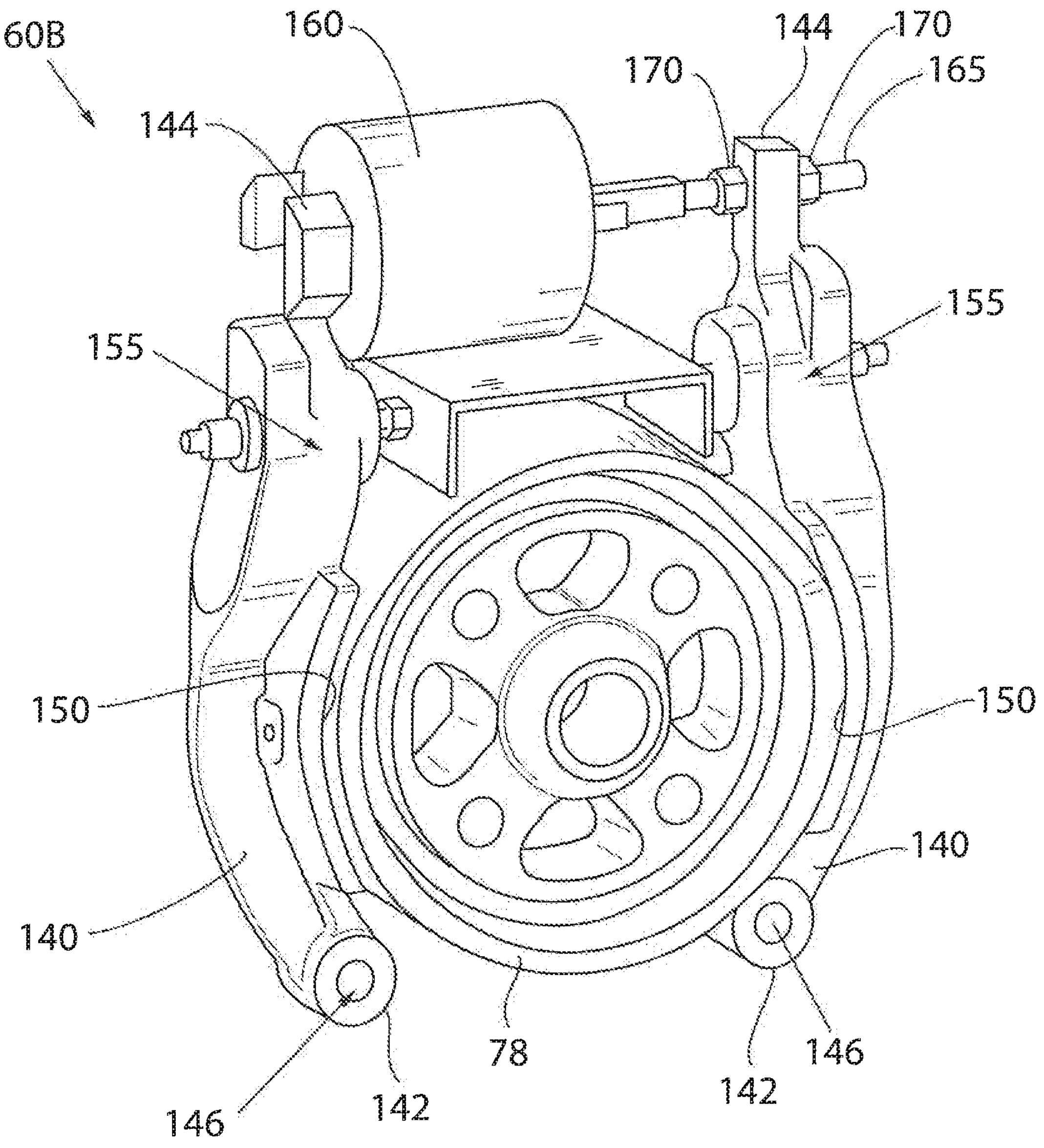
FIG. 5 is a perspective view of another exemplary brake which may be used in the system of FIG. 1 which includes brake pads configured to engage an exterior rotating surface.

Referring next to FIG. 5, a perspective view of a second exemplary brake 60B which may be used in the system of FIG. 1 is provided in accordance with an embodiment of the invention. The brake 60B includes a pair of arms 140 where one arm 140 is mounted on either side of the drive sheave 78. A portion of the outer periphery of the drive sheave 78 includes a smooth surface against which brake pads 150 engage rather than grooves configured to receive the ropes 20 of the elevator. Optionally, a brake drum may be mounted adjacent to or on an opposite side of the motor 70 from the drive sheave 78, where the brake drum provides the smooth surface against which brake pads 150 engage. Each arm 140 has a first end 142 and a second end 144. The first end 142 of each arm 140 includes a pivot mount 146 and the second end 144 of each arm is mounted to a rod 165 or cylinder. The rod 165 or cylinder is movable between a first position and a second position by an actuator 160.

The brake 60B is operative in one of two states. During a first, unenergized state, the brake is set and prevents rotation of the motor 70. In the first state, one or more springs 155 mounted within or engaging a portion of each arm 140 proximate the second end 144 of each arm apply a force causing each arm 140 to pivot around the pivot mount 146 toward the sheave 78 or brake drum. The force of the springs 155 is sufficient to cause each brake pad 150 to engage the smooth surface of either the drive sheave 78 or the brake drum, preventing rotation of the elevator drive. The springs 155 continually apply the force, such that when the brake is unenergized, the springs 155 cause the brake 60 to be set and hold the drive sheave 78 stationary.

During a second, energized state, the brake 60B is released and allows rotation of the motor 70. In the second state, power is provided to the actuator 160. In the illustrated embodiment, the actuator 160 is a solenoid which causes the rod 165 to extend a distance from within the housing of the solenoid 160. The distance the rod 165 extends is sufficient to pivot each arm 140 away from the drive sheave 78 or brake drum, allowing rotation of the sheave 78 or brake drum. The rod 165 is threaded as it extends through the second end 144 of one of the arms 140. Nuts 170 mounted along the threaded portion of the rod 165 may be used to adjust the distance the second end 144 of the arm moves when the solenoid 160 is energized or de-energized. The nuts 170 adjust the amount of force applied by the brake pads 150 on the drive sheave 78 or brake drum when the solenoid 160 is de-energized and adjust the distance the arm 140 rotates, releasing the pressure from the brake pads 150 on the drive sheave 78 or brake drum when the solenoid 160 is energized. Thus, with the brake 60B properly adjusted, the drive sheave 78 should freely rotate, allowing the motor 70 to control operation of the elevator cab 14.

The illustrated brakes are intended to be exemplary only and are not limiting. Other configurations of the brake may include, for example, disk-style brakes engaging a surface of the sheave. The invention discussed below may be used with brakes of various configurations to detect whether the brake has fully opened.

In operation, the motor drive 40 controls operation of the motor 70 which, in turn, controls the elevator drive train and motion of the elevator cab 14. For discussion herein, it is contemplated that an elevator controller 73 issues a run command to the motor drive 40. The motor drive 40, in turn, generates an output signal to the brake 60 to energize or de-energize, synchronizing control of the brake 60 with operation of the motor 70. According to another embodiment, the elevator controller 73 may generate the output signal to the brake 60 and synchronize control of the brake 60 with operation of the motor drive 40. In either embodiment, the motor drive 40 may be configured to detect a dragging brake during operation of the motor 70.

Figure 6:
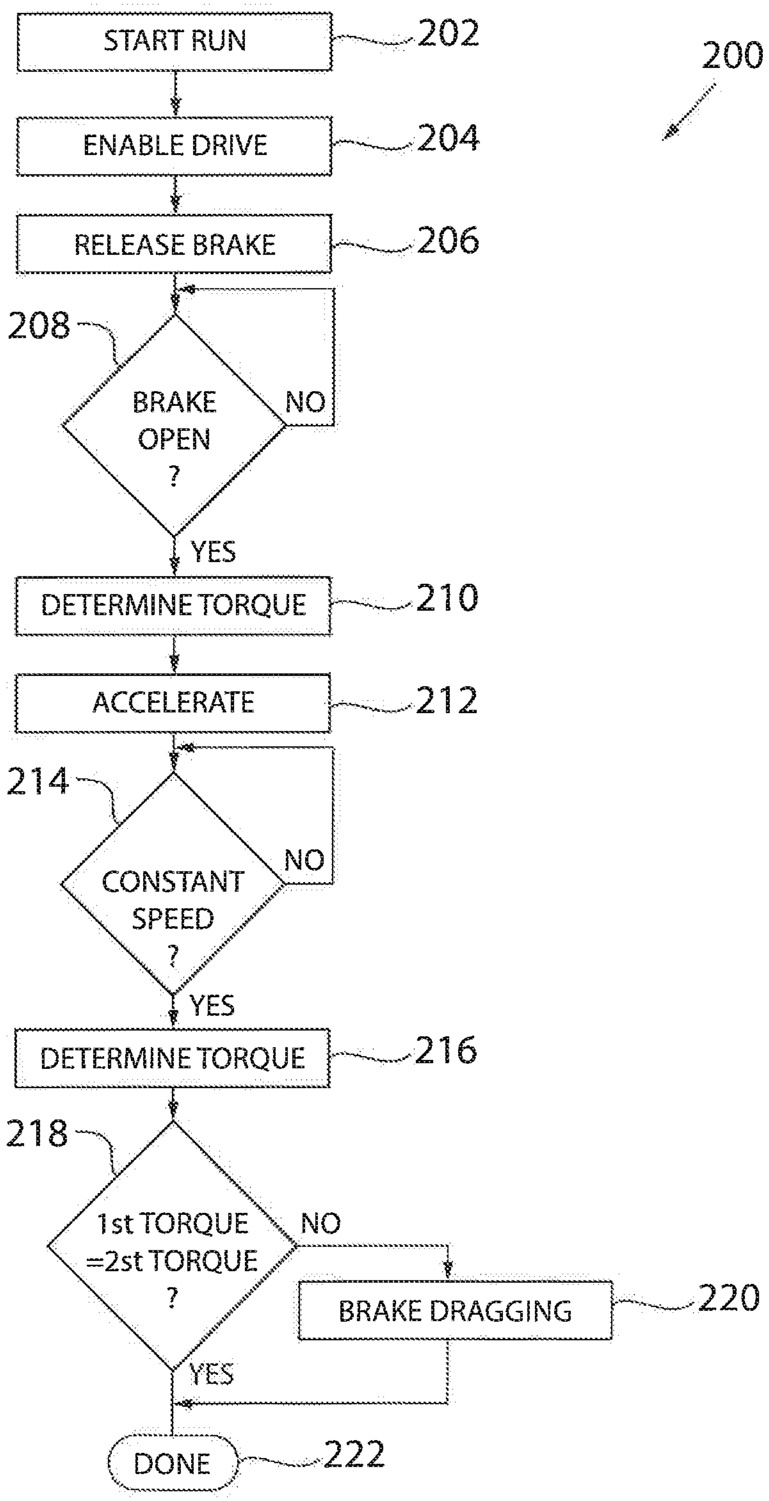
FIG. 6 is a flow diagram illustrating one embodiment of the present invention.

Turning next to FIG. 6, a flow diagram 200 illustrates one embodiment of the steps performed by a motor drive 40 to detect the dragging brake. At step 202, the motor drive 40 receives a command to begin a run. During a run, the elevator cab 14 is commanded to move from a first floor, at which it presently located, to a second floor, where passengers either wish to exit or enter the cab 14. The motor drive 40 is enabled, as shown in step 204, and begins generating a current corresponding to a desired torque required to hold the elevator cab 14 at its present position.

The amount of torque required to hold the elevator cab 14 at its initial position is a factor of a number of variables. These include, for example, the mass of the car, the mass of the passengers present in the car, the mass of the counter weight, the radius of the drive sheave 78, and a gear reduction ratio when a gearbox is utilized. Numerous techniques are used in the art to determine the amount of torque required to initially hold the weight of the cabin and passengers present in the cabin. Any suitable technique to determine the required torque may be utilized without deviating from the scope of the present invention. For purposes of discussion, the elevator system may include a weight measurement device that determines a total weight of the cabin 14 and passengers before commanding the motor drive 40 to begin operation. The elevator controller 73 may receive a feedback signal from the weight measurement device and transmit the weight directly or, alternately, may perform some initial processing of the measured weight and transmit a desired torque to the motor drive 40.

Once the motor drive 40 is enabled and generating a suitable torque to hold the elevator cab 14 at its current position, the motor drive sets the output signal to release the brake, as shown in step 206. With reference to the brake 60B illustrated in FIG. 5, the output signal may be a digital output signal which, for example, closes a relay which, in turn, connects the solenoid 160 of a brake 60B to power, energizing the solenoid. There is some time required for the solenoid to energize, the rod 165 to extend, and the brake pads 150 to fully disengage the drive sheave 78 or brake drum, thereby disengaging the mechanical holding brake 60B. As shown in step 208 of FIG. 6, the motor drive 40 will execute a loop until the brake 60B opens. The brake 60B may include a proximity sensor or a microswitch that is set when the arm 140 is fully pivoted away and which generates a brake open feedback signal. Optionally, the motor drive 40 may execute a delay timer corresponding to an expected time required for the mechanical brake 60 to open.

Throughout the duration of time required to open the brake 60, the motor drive 40 may be executing a motor control module in the processor 50. The motor drive 40 receives the position feedback signal 95 from the position sensor 80 and holds the elevator cab at its starting position. If the current is too low or too great to hold the elevator cab at its starting position, the motor control module executing on the processor 50 increases or decreases the amount of current output from the motor drive 40 to the motor 70 such that the motor is able to maintain the elevator cab 14 at the desired position. The motor control module may include a single control loop or multiple control loops executing in parallel or in cascade. According to one embodiment of the invention, it is contemplated that a first control loop, operating at a slower update rate, operates on the position feedback signal 95. The first control loop receives a position reference signal, which corresponds to the initial position of the elevator cab 14, and the position feedback signal 95 and determines a difference between the two values. A position control loop including a proportional controller, an integral controller, a differential controller, or a combination thereof, outputs a torque reference signal, corresponding to a desired torque to be applied by the motor 60 to hold the elevator cab 14 at its initial position. The torque reference signal is, in turn, provided as an input to a current control loop operating at a faster update rate. Optionally, the torque reference signal may first be converted to a current reference signal by a torque constant. According to still another option, the torque constant may be incorporated into the controller gains of the current control loop. The current control loop includes a proportional controller, an integral controller, a differential controller, or a combination thereof and regulates the current supplied from the motor drive 40 to the motor 70 to obtain the desired torque at the motor.

Once the brake 60 has opened, the motor drive 40 determines a first value of torque being produced by the motor 70, as indicated at step 210. The first value of torque may correspond to the torque reference being generated by the motor control module as indicated above. Optionally, a current feedback signal 57 from a current sensor 56 at the output 22 of the motor drive 40 may be used to determine the amount of torque being produced by the motor 70. This first value of torque corresponds to the amount of torque required to hold the elevator cab 14 at its current position or, in other words, the amount of torque required to prevent acceleration due to gravity from causing the elevator cab to move either upward or downward in the elevator shaft.

After determining this first value of torque, the motor drive 40 may begin accelerating the motor 70 and, in turn, the elevator cab 14 to a desired speed, as shown in step 212. The motor drive 40 will continue looping at step 214 until the motor 70 and cab 14 reach a constant speed. Once the motor 70 has reached a constant speed of operation, the motor drive 40 determines a second value of torque being produced by the motor, as shown in step 216. Just as with the first value of torque, the second value of torque may correspond to the torque reference being generated by the motor control module as indicated above. Optionally, a current feedback signal 57 from a current sensor 56 at the output 22 of the motor drive 40 may be used to determine the amount of torque being produced by the motor 70. This second value of torque corresponds to the amount of torque required to maintain the constant speed of operation of the elevator cab 14. In an ideal system, the only external force acting on the elevator cab 14 would be gravity. As a result, the amount of torque required by the motor 70 to maintain the constant speed of operation would be identical to the amount of torque required by the motor 70 to maintain zero speed operation.

In a typical elevator application, some additional torque is required, for example, to overcome friction forces between the cables 20 and sheave 78 or to overcome gearbox inefficiencies. The motor drive 40 may include a parameter stored in memory 52 defining an expected amount of additional torque required by the motor 70 during constant speed operation versus zero speed operation. This value may be set by a technician during commissioning and may define an acceptable difference between the first torque value and the second torque value. Optionally, the motor drive 40 may be configured to automatically detect the difference between the first value of torque and the second value of torque. The motor drive 40 may be programmed to enter a learning mode. During the learning mode, the motor drive 40 may determine one or more values of the difference between the first value of torque and the second value of torque and identify an expected offset between the two values. The motor drive may store this offset and use it in subsequent runs to detect a dragging brake.

As shown in steps 218 and 220, the motor drive 40 uses the first and second values of torque, previously determined as indicated above, to detect whether the brake 60 is dragging. The motor drive 40 compares the first value of torque to the second value of torque. The comparison may be made, for example, by finding a difference between the first and second values of torque. The difference may, in turn, be compared to a predefined threshold or to the offset value. If the difference between the two values is less than the threshold or less than the offset value, the motor drive 40 determines that the brake 60 is fully open and moves to step 222, completing the check for a dragging brake. If, however, the motor drive 40 determines that the difference between the two values is greater than the threshold or the offset value, the motor drive determines that the brake 60 is dragging, as indicated in step 220. The motor drive 40 may set a fault message alerting a technician to the dragging brake so that repair may be performed before there is excessive heating and/or wear on the brake 60.

Figure 7A:
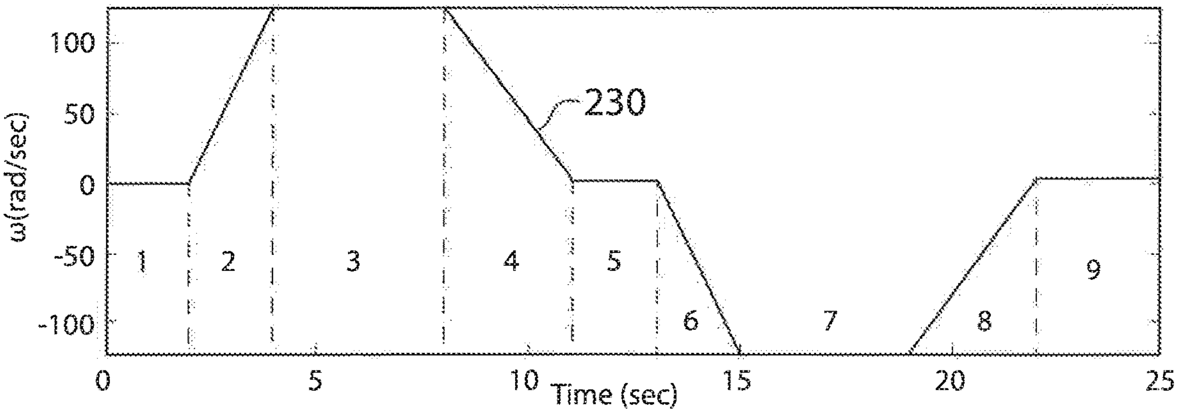
FIG. 7A is a graphical representation of angular velocity of a motor during forward and reverse operation.
Figure 7B:
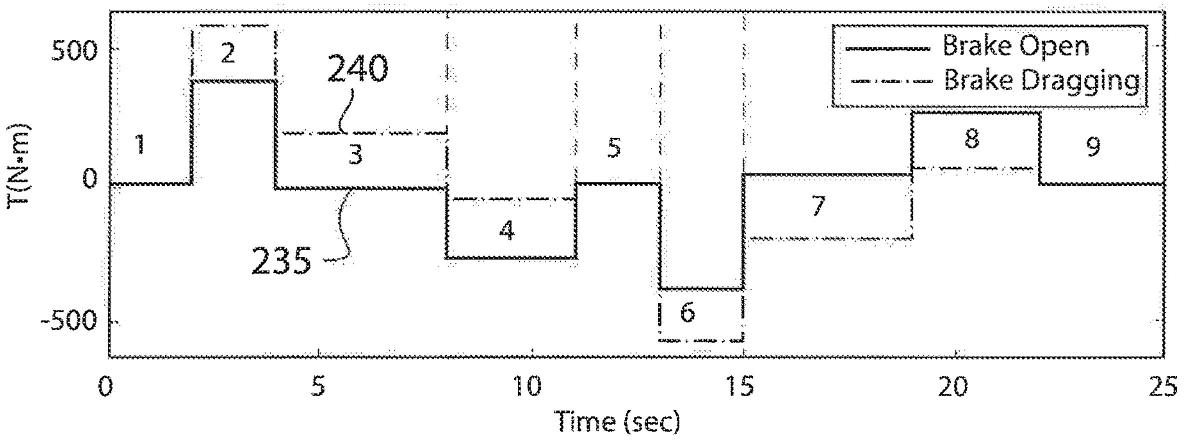
FIG. 7B is a graphical representation of torque produced during the forward and reverse operation shown in FIG. 7A both with and without a dragging brake.

With reference next to FIGS. 7A and 7B, exemplary waveforms illustrating both normal operation and a dragging brake condition are shown. FIG. 7A first shows an exemplary elevator run in both directions. During the first time period shown, the motor drive 40 executes steps 202 through 208 shown in FIG. 6. The motor drive 40 accelerates to a constant speed during the second time period and runs at a constant speed during the third time period. After running for some time at constant speed, the motor drive 40 decelerates back to zero speed and the brake is set until the next run. The steps are then repeated for the opposite direction.

As may be observed in FIG. 7B, the torque required to hold the motor 70 at zero speed during the first time period and to run at constant speed during the third time period are identical when the brake is open, as shown in plot 235. Although illustrated as requiring no torque, this is a special condition in an elevator at which the weight of the cabin 14 and passengers equal the weight of the counter weight. During this operating condition, no or very little torque is required from the motor 70 to maintain zero speed. If the cabin 14 is empty (minimum weight) or full (maximum weight), the torque required to maintain zero speed will shift up or down around zero. However, the plot 235 would shift by an equal amount for the entire duration of the plot. The balanced condition shown in FIG. 7B is used for ease of illustration and is not intended to be limiting. If the brake is dragging, as shown in plot 240, the torque required during the first time period remains at zero, but additional torque is required during the third time period to overcome the dragging brake. The motor drive 40 detects the additional torque and provides an indication that the brake is dragging.

In addition to detecting a dragging brake on an individual run, it is contemplated that the present invention may be utilized to detect a change in operation of the brake over time. As previously indicated, a technician may enter an expected difference between torque required by the motor to operate at zero speed versus operating at constant speed. Alternately, the motor drive may execute a commissioning run or monitor one or more runs during initial operation. The motor drive 40 may store an initial value in memory 52 corresponding to an expected difference in torque during operation at constant speed versus operation at zero speed. This initial value may be compared to subsequent runs to detect changes in the torque over time. While the motor drive 40 may still maintain a first threshold indicating that the brag is dragging, the motor drive 40 may also include a second threshold indicating maintenance is required. This second threshold may be set at a lower difference than the first threshold. A separate message may be generated to alert a technician that maintenance is required. The maintenance may then be scheduled at a convenient time.

It should be understood that the invention is not limited in its application to the details of construction and arrangements of the components set forth herein. The invention is capable of other embodiments and of being practiced or carried out in various ways. Variations and modifications of the foregoing are within the scope of the present invention. It also being understood that the invention disclosed and defined herein extends to all alternative combinations of two or more of the individual features mentioned or evident from the text and/or drawings. All of these different combinations constitute various alternative aspects of the present invention. The embodiments described herein explain the best modes known for practicing the invention and will enable others skilled in the art to utilize the invention.

In the preceding specification, various embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

We claim:

1. A system for detecting a dragging brake in an elevator drive, the system comprising:
an elevator brake, including:
at least one braking surface configured to engage a rotating member of the elevator drive to prevent rotation of the elevator drive,
a spring configured to apply a force to the at least one braking surface causing the at least one braking surface to engage the rotating member of the elevator drive, and
an actuator selectively activated to apply a counter force to the spring, wherein when the counter force is applied to the spring, the at least one braking surface disengages the rotating member of the elevator drive, allowing rotation of the elevator drive;
a motor operably connected to cause rotation of the elevator drive; and
a motor drive configured to control operation of the motor, wherein the motor drive further comprises:
a memory configured to store instructions, and
a processor configured to execute the instructions stored on the memory to:
determine a first value of torque when the actuator of the elevator brake initially disengages the at least one braking surface from the rotating member of the elevator drive and prior to causing rotation of the elevator drive,
determine a second value of torque when the motor is rotating at a constant speed, and
compare the first value of torque to the second value of torque to detect when the at least one braking surface of the elevator brake does not fully disengage the rotating member of the elevator drive during rotation of the elevator drive.

2. The system of claim 1 wherein the motor drive is configured to generate a torque reference value corresponding to a desired level of torque supplied by the motor, and wherein the first and second values of torque are torque reference values.

3. The system of claim 1 wherein the motor drive further comprises at least one current sensor configured to generate a current feedback signal corresponding to current output from the motor drive to the motor and wherein the first and second values of torque are determined as a function of the current feedback signal.

4. The system of claim 1, wherein:
comparing the first value of torque to the second value of torque includes determining a difference between the first and second values of torque, and
detecting when the at least one braking surface of the elevator brake does not fully disengage the rotating member of the elevator drive during rotation of the elevator drive includes comparing the difference to a predetermined threshold and detecting the dragging brake when the difference is greater than the predetermined threshold.

5. The system of claim 1, wherein the motor drive is further configured to initially determine an offset value between the first value of torque and the second value of torque.

6. The system of claim 5, wherein:
comparing the first value of torque to the second value of torque includes determining a difference between the first and second values of torque, and
detecting when the at least one braking surface of the elevator brake does not fully disengage the rotating member of the elevator drive during rotation of the elevator drive includes comparing the difference to the offset value and detecting the dragging brake when the difference is greater than the offset value.

7. A system for detecting a dragging brake for an electric motor, the system comprising:
a motor configured to control motion of a drive train for a load having an additional force acting on the load to cause motion of the load when not controlled by the drive train;
a motor drive operatively connected to the motor, wherein the motor drive is configured to:
determine a first value of torque when a holding brake in the drive train is initially released and prior to causing motion of the drive train with the motor,
determine a second value of torque when the motor is rotating at a constant speed, and
compare the first value of torque to the second value of torque to detect when the holding brake does not fully disengage the drive train during operation of the motor.

8. The system of claim 7 wherein the motor drive is configured to generate a torque reference value corresponding to a desired level of torque supplied by the motor, and wherein the first and second values of torque are torque reference values.

9. The system of claim 7 wherein the motor drive further comprises at least one current sensor configured to generate a current feedback signal corresponding to current output from the motor drive to the motor and wherein the first and second values of torque are determined as a function of the current feedback signal.

10. The system of claim 7, wherein:
comparing the first value of torque to the second value of torque includes determining a difference between the first and second values of torque, and
detecting when the holding brake does not fully disengage the drive train includes comparing the difference to a predetermined threshold and detecting the dragging brake when the difference is greater than the predetermined threshold.

11. The system of claim 7, wherein the motor drive is further configured to initially determine an offset value between the first value of torque and the second value of torque.

12. The system of claim 11, wherein:
comparing the first value of torque to the second value of torque includes determining a difference between the first and second values of torque, and
detecting when the holding brake does not fully disengage the drive train includes comparing the difference to the offset value and detecting the dragging brake when the difference is greater than the offset value.

13. The system of claim 7, wherein:
the motor drive further comprises an input configured to receive a position feedback signal,
the position feedback signal is generated by a position feedback device operatively connected to the motor,
the position feedback signal corresponds to an angular position of the motor, and
the motor drive is configured to control operation of the motor to maintain the load at an initial position determined from the position feedback signal when the holding brake is released and until the first value of torque is determined.

14. The system of claim 7, wherein:

the drive train is an elevator drive train, the holding brake is an elevator brake, including:

at least one braking surface configured to engage a rotating member of the elevator drive train to prevent rotation of the elevator drive train, a spring configured to apply a force to the at least one braking surface causing the at least one braking surface to engage the rotating member of the elevator drive train, and an actuator selectively activated to apply a counter force to the spring, wherein when the counter force is applied to the spring, the at least one braking surface disengages the rotating member of the elevator drive train, allowing rotation of the elevator drive train, the load is an elevator cab and counter weight, and the additional force is a force resulting as a difference between a weight of the elevator cab and a weight of the counter weight.

15. A method for detecting a dragging brake for an electric motor, the method comprising the steps of:

determining a first value of torque generated in a motor operatively connected to a motor drive when a holding brake in a drive train between the motor and a load controlled by the motor is initially released, wherein:

the motor drive is configured to determine the first value of torque, and the load has an additional force acting on the load to cause motion of the load when not controlled by the drive train;

determining a second value of torque when the motor is rotating at a constant speed; and comparing the first value of torque to the second value of torque to detect the dragging brake.

16. The method of claim 15 further comprising the step of generating a torque reference value with the motor drive, wherein the torque reference value corresponds to a desired level of torque supplied by the motor and wherein the first and second values of torque are torque reference values.

17. The method of claim 15 further comprising the step of generating a current feedback signal with at least one current sensor in the motor drive, wherein the current feedback signal corresponds to current output from the motor drive to the motor and wherein the first and second values of torque are determined as a function of the current feedback signal.

18. The method of claim 15 wherein the step of comparing the first value of torque to the second value of torque further comprises the steps of:

determining a difference between the first and second values of torque, and comparing the difference to a predetermined threshold, and detecting the dragging brake when the difference is greater than the predetermined threshold.

19. The method of claim 15, further comprising an initial step of determining an offset value between the first value of torque and the second value of torque with the motor drive, wherein the step of comparing the first value of torque to the second value of torque further comprises the steps of:

determining a difference between the first and second values of torque, and detecting the dragging brake when the difference is greater than the offset value.

20. The method of claim 15, further comprising the steps of:

receiving a position feedback signal at an input of the motor drive, wherein the position feedback signal is generated by a position feedback device operatively connected to the motor and wherein the position feedback signal corresponds to an angular position of the motor, and controlling operation of the motor with the motor drive to maintain the load at an initial position determined from the position feedback signal when the holding brake is released and until the first value of torque is determined.

* * * * *